United States Patent
Shen et al.

(10) Patent No.: US 7,512,621 B2
(45) Date of Patent: Mar. 31, 2009

(54) MOVING RECORDS BETWEEN PARTITIONS

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/424,079

(22) Filed: Jun. 14, 2006

(65) Prior Publication Data

US 2007/0294276 A1    Dec. 20, 2007

(51) Int. Cl.
*G06F 17/30* (2006.01)

(52) U.S. Cl. .............................. 707/101; 707/1; 707/3; 707/100

(58) Field of Classification Search ............... 707/1, 707/3, 10, 100, 101; 711/147, 153, 173
See application file for complete search history.

(56) References Cited

U.S. PATENT DOCUMENTS

| | | | |
|---|---|---|---|
| 6,125,370 A * | 9/2000 | Courter et al. .............. 707/202 |
| 6,269,375 B1 * | 7/2001 | Ruddy et al. ................ 707/101 |
| 6,757,805 B2 * | 6/2004 | Wu ............................. 711/173 |
| 6,834,296 B2 * | 12/2004 | Brown et al. ................ 709/215 |
| 7,035,851 B1 * | 4/2006 | Sinclair et al. ................. 707/7 |
| 2005/0278488 A1 * | 12/2005 | Flemming et al. ........... 711/153 |

* cited by examiner

*Primary Examiner*—Cam-Linh Nguyen
(74) *Attorney, Agent, or Firm*—Owen J. Gamon (57) ABSTRACT

In a method, data is partitioned into partitions, which are divided into levels. The levels are ordered by creation times of the levels. A request is received at a current partition, which includes a key that identifies a field in a record and a value for the key. A determination is made whether the value exists in the field in the current partition. If the determination is false, a message is sent from the current partition to a next-older partition, and the message instructs the next-older partition to move the record with the value from the next-older partition to the current partition. If the determination is true, the record with the value in the field is moved from the current partition to a next-newer partition if the next-newer partition sent the request, and the record is deleted from the current partition.

14 Claims, 10 Drawing Sheets

DATA 157

| | 302 | 303 | 304 | |
|---|---|---|---|---|
| | NAME | STATE | ZIP | |
| 300 | MARIE | MINNESOTA | 55901 | |
| 301 | MURIE | TEXAS | 78758 | |

FIG. 3A

NEWEST ROUTING TABLE (N LEVEL) 160-1

| 330 | 335 | 340 | |
|---|---|---|---|
| KEY | VALUE | PARTITION ID | |
| NAME | AA - AZ | PARTITION A | 305 |
| NAME | BA - BZ | PARTITION B | 310 |
| NAME | MA - MK | PARTITION M1 | 315 |
| NAME | ML - MZ | PARTITION M2 | 320 |
| NAME | ZA - ZZ | PARTITION Z | 325 |

FIG. 3B

NEXT NEWEST ROUTING TABLE (N-1 LEVEL) 160-3

| 370 | 375 | 380 | |
|---|---|---|---|
| KEY | VALUE | PARTITION ID | |
| NAME | AA - AZ | PARTITION A | 350 |
| NAME | BA - BZ | PARTITION B | 355 |
| NAME | MA - MZ | PARTITION M | 360 |
| NAME | ZA - ZZ | PARTITION Z | 365 |

MOVING RECORDS BETWEEN PARTITIONS

FIELD

An embodiment of the invention generally relates to computer systems with partitioned data and more specifically relates to moving data records between partitions.

BACKGROUND

Fundamentally, computer systems are used for the storage, manipulation, and analysis of data. One mechanism for managing data is called a database management system, which may also be called a database system or simply a database. The most common is usually called a relational database (RDB), which organizes data in tables that have rows, which represent individual entries or records in the database, and columns, which define what is stored in each row, entry, or record. Each table has a unique name within the database and each column has a unique name within the particular table. The database also has an index, which is a data structure that informs the database management system of the location of a certain row in a table given an indexed column value, analogous to a book index informing the reader on which page a given word appears.

Data in databases is often divided or distributed across multiple partitions, in which a database table is stored using more than one physical data space, but the table appears as one object for data manipulation operations, such as queries, inserts, updates, and deletes. Partitioning has two fundamental types: horizontal and vertical. Horizontal partitioning allows tables to be partitioned into disjoint sets of rows, which are physically stored and accessed separately in different data spaces. In contrast, vertical partitioning allows a table to be partitioned into disjoint sets of columns, which are physically stored and accessed separately in different data spaces. Partitioning of data can significantly improve performance of the requests that access the data, but partitioning also has the potential to decrease performance if done improperly.

Database administrators often partition data so that it is evenly distributed across multiple partitions, in order to increase performance of requests that access the partitions, so that no one partition is a bottleneck for the requests. Unfortunately, after months or years of operations against the data (e.g., updates, insertions, and deletions), the partitions may become more and more unevenly distributed, which results in an uneven distribution of requests to the partitions. Consequent decreased performance occurs as the partitions with the most data receive the most requests and hence become performance bottlenecks.

To correct an uneven distribution of partitioned data, administrators often redistribute the data by moving data between existing partitions or by creating new partitions and copying data from the existing partitions to the new partitions. Current techniques must shut down the database or block requests to the database while redistributing the data. Because of the large amount of data that is often involved, this redistribution may take hours, days, or even weeks, during which time the data is unavailable. Such an extended period of data unavailability is burdensome or unacceptable for many users.

Hence, an enhanced technique for redistributing data across partitions is needed.

SUMMARY

A method is provided. In an embodiment, data is divided into partitions, which are divided into levels. The levels are ordered by creation times of the levels, from a newest level to an oldest level. A request is received at a current partition, and the request includes a key that identifies a field in a record and a value for the key. A determination is made whether the value exists in the field in the current partition. If the determination is false, a message is sent from the current partition to a next-older partition in a next-older partition level, wherein the message instructs the next-older partition to move the record with the value in the field from the next-older partition to the current partition. If the determination is true, the record with the value in the field is moved from the current partition to a next-newer partition if the next-newer partition sent the request, and the record is deleted from the current partition. Once the data in the current partition is empty, the current partition is deleted. In an embodiment, the record with the value in the field is moved from the current partition to the newest partition. In this way, records may be moved from older to newer partitions while requests to the partitions are still fulfilled.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
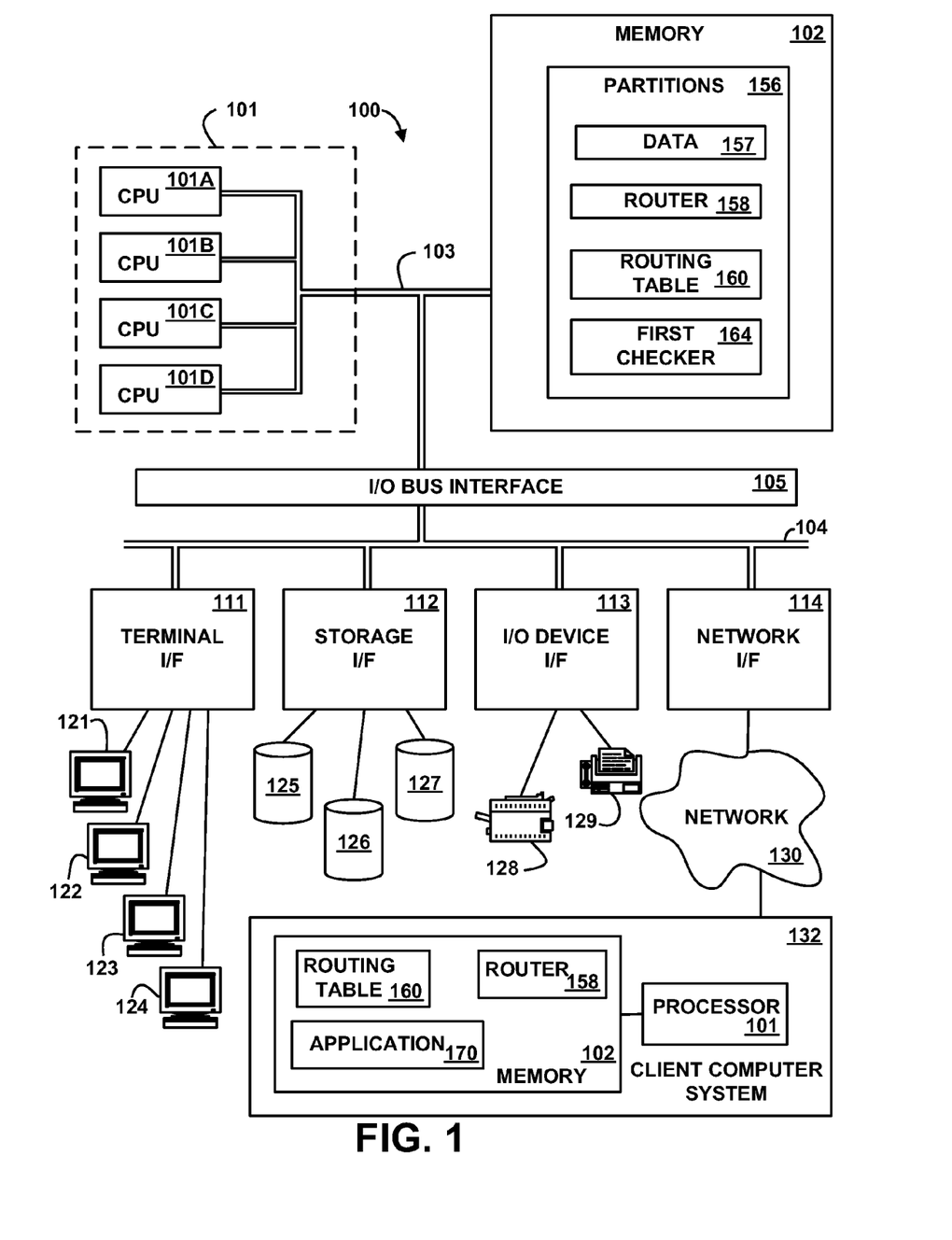
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "client" and "server" are used herein for convenience only, and in various embodiments a computer that operates as a client in one environment may operate as a server in another environment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes partitions 156. Although the partitions 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the partitions 156 are illustrated as being contained within the main memory 102, all the portions of the partitions 156 are not necessarily all completely contained in the same storage device at the same time. Further, although the partitions 156 are illustrated as being a single entity, in other embodiments some of them, or portions of some of them, may be packaged separately.

The partitions 156 include data 157, a router 158, a routing table 160, and a first checker 164. The partitions 156 are further described below with reference to FIG. 2. The data 157 is further described below with reference to FIG. 3A. The routing table 160 is further described below with reference to FIGS. 3B and 3C. The first checker 164 is further described below with reference to FIG. 4.

In an embodiment, the router 158 includes instructions capable of executing on the processor 101 or statements capable of being interpreted by instructions executing on the processor 101 to perform the functions as further described below with reference to FIGS. 5, 6, 7, 8, 9, and 10. In another embodiment, the router 158 may be implemented in microcode. In another embodiment, the router 158 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client computer system 132 may include some or all of the hardware and/or software elements previously described above for the computer system 100. The client computer system 132 includes a processor 101 connected to memory 102. The memory 102 in the client computer system 132 includes a router 158, a routing table 160, and an application 170. The application 170 sends requests to the router 158. The router 158 uses the routing table 160 to route the requests to the partitions 156. Although the client computer system 132 is illustrated as being separate from and connected to the computer system 100 via the network 130, in another embodiment, the client computer system 132 may be part of the computer system 100, e.g., the client 132 may be implemented as a software program and data stored in the memory 102.

It should be understood that FIG. 1 is intended to depict the representative major components of the computer system 100, the network 130, and the client computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
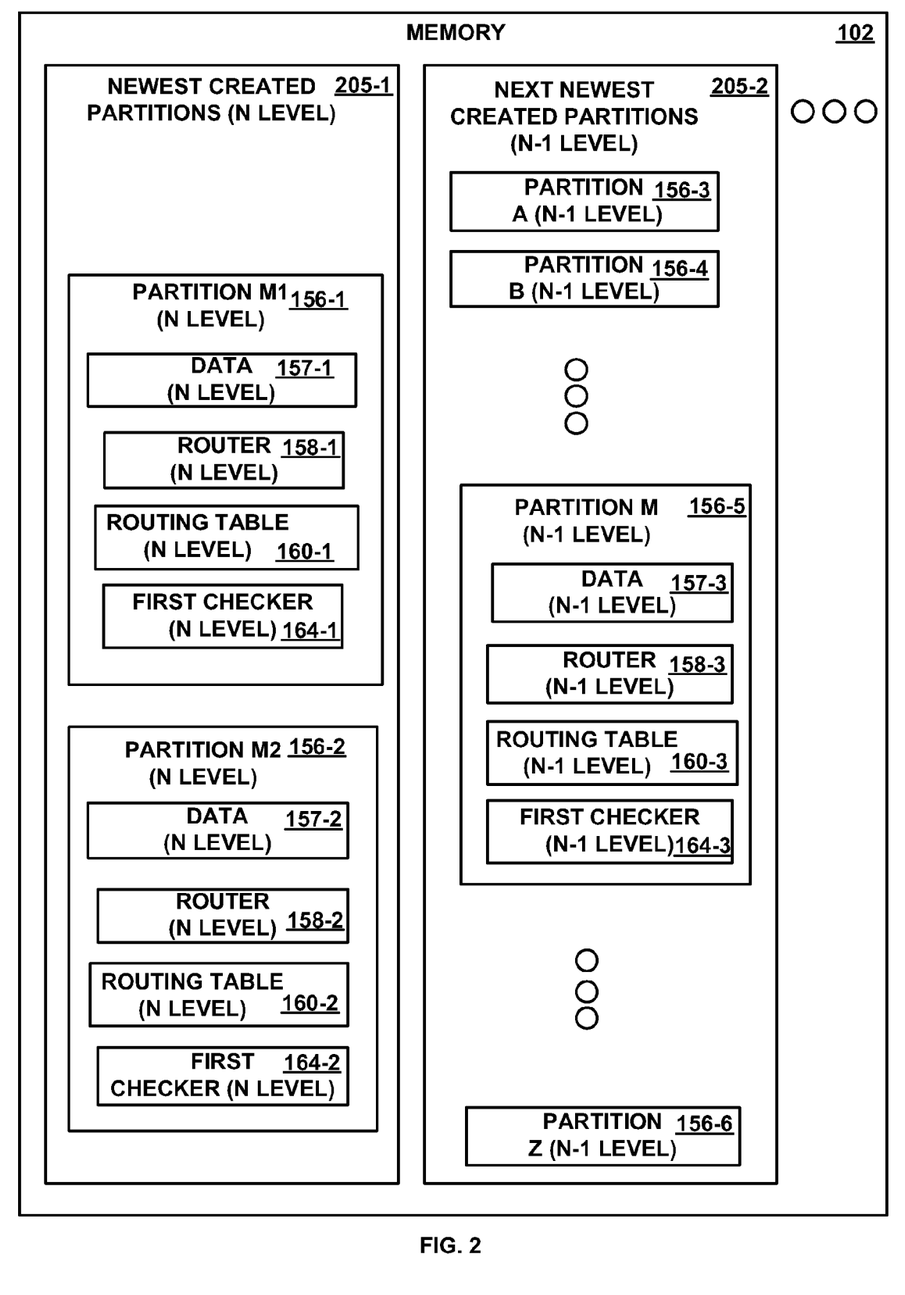
FIG. 2 depicts a block diagram of example partitions in memory, according to an embodiment of the invention.

FIG. 2 depicts a block diagram of example partitions in the memory 102, according to an embodiment of the invention. The memory 102 includes example partitions 156-1, 156-2, 156-3, 156-4, 156-5, and 156-6, all of which are example instances of the partitions 156 (FIG. 1). The partitions are divided into partition levels 205-1 and 205-2, of which any number may exist.

The partition level 205-1 is denominated as the "N level," meaning that it is the most new partition level and is newer than all other partition levels, such as the partition level 205-2, which is denominated the "N-1" level, meaning that it is one level older than the partition level 205-1 (N level). The newness of a partition level refers to the date and/or time that the partitions that are included in the partition level were created and an record for the newly created partition was placed into the routing table 160 for that partition level. Thus, the partition levels 205-1 and 205-2 are ordered by the creation times of the levels, from a newest level 205-1 to an oldest level, which is the partition level 205-2 in the example of FIG. 2, but in other embodiments more levels may exist.

The partition level (N level) 205-1 includes partition M1 156-1 and partition M2 156-2. The partition M1 (N level) 156-1 includes data (N level) 157-1, a router (N level) 158-1, a routing table (N level) 160-1, and a first checker (N level) 164-1. The data (N level) 157-1 is an example of the data 157 (FIG. 1). The router (N level) 158-1 is an example of the router 158 (FIG. 1). The routing table (N level) 160-1 is an example of the routing table 160 (FIG. 1). The first checker (N level) 164-1 is an example of the first checker 164 (FIG. 1).

The partition M2 (N level) 156-2 includes data (N level) 157-2, a router (N level) 158-2, a routing table (N level) 160-2, and a first checker (N level) 164-2. The data (N level) 157-2 is an example of the data 157 (FIG. 1). The router (N level) 158-2 is an example of the router 158 (FIG. 1). The routing table (N level) 160-2 is an example of the routing table 160 (FIG. 1). The first checker (N level) 164-2 is an example of the first checker 164 (FIG. 1).

The partition level (N-1 level) 205-2 includes partition A (N-1 level) 156-3, partition B (N-1 level) 156-4, partition M (N-1 level) 156-5, and partition Z (N-1 level) 156-6. The partition M (N-1 level) 156-5 includes data (N-1 level) 157-3, a router (N-1 level) 158-3, a routing table (N-1 level) 160-3, and a first checker (N-1 level) 164-3. The data (N-1 level) 157-3 is an example of the data 157 (FIG. 1). The router (N-1 level) 158-3 is an example of the router 158 (FIG. 1). The routing table (N-1 level) 160-3 is an example of the routing table 160 (FIG. 1). The first checker (N-1 level) 164-3 is an example of the first checker 164 (FIG. 1).

The partition M1 (N level) 156-1 and the partition M2 (N level) 156-2 represent more newly created partitions that are to be a replacement for the partition M (N-1 level) 156-5. The database administrator may request the router 158 to make this change because, e.g., the data (N-1 level) 157-3 in the partition M (N-1 level) 156-5 has more records or is receiving more requests than other partitions (e.g., the partition A (N-1 level) 156-3 or the partition Z (N-1 level) 156-6). But, all of the data (N-1 level) 157-3 is not necessarily immediately moved to the data (N level) 157-1 in the partition M1 (N level) 156-1 and to the data (N level) 157-2 in the partition M2 (N level). Instead, the router 158 moves the records from the data (N-1 level) 157-3 to the data (N level) 157-1 in the partition M1 (N level) 156-1 and to the data (N level) 157-2 in the partition M2 (N level) over time while the router 158 continues to process requests for the data from the client computer system 132, as further described below with reference to FIGS. 5, 6, 7, 8, 9, and 10. Eventually, all the data that once was in the partition M 156-5 may be moved to the newer partitions M1 156-1 and 156-2, after which the partition M 156-5 may be deleted. But, until such time as the movement of all of the data from the partition M 156-5 to the newer partition level is complete, the data that was once in the partition M 156-5 is distributed across the data 157-3, the data 157-1 and the data 157-2.

The routers 158 search the partitions levels for requested data (via a key and a value that together identify a data record) in the order of the partition levels, starting from the newest level and progressing towards the oldest level using the various routing tables for each level. A particular partition level does not contain all of the data, which is distributed or divided into the various partitions, e.g., the partition A (N-1 level) 156-3 in the partition level 205-2 has no counterpart partition in the partition level 205-1. Further, the partition M1 156-1.

Figure 3A:
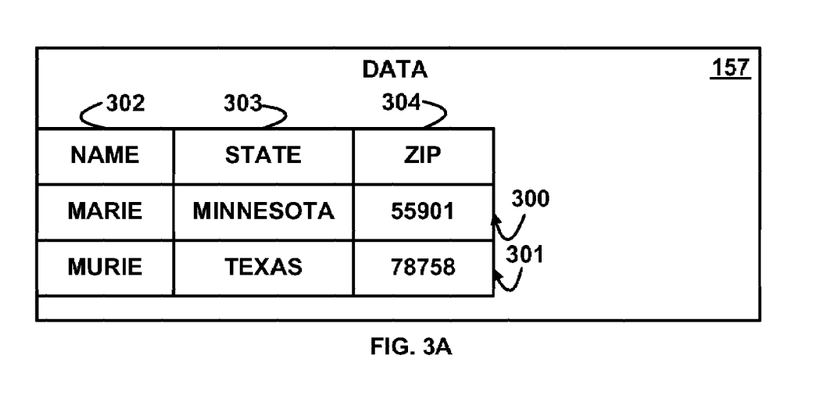
FIG. 3A depicts a block diagram of example data, according to an embodiment of the invention.

FIG. 3A depicts a block diagram of example data 157, according to an embodiment of the invention. The data 157 includes example records 300 and 301, which may be rows or data items, each of which includes columns or fields 302, 303, and 304. Some or all of the columns 302, 303, and 304 may be used as keys to access the data 157. The columns or fields 302, 303, and 304 store values in the records 300 and 301. For example, the record 300 includes a value of "Marie" in the column 302, a value of "Minnesota" in the column 303, and a value of "55901" in the column 304. As another example, the record 301 includes a value of "Murie" in the column 302, a value of "Texas" in the column 303, and a value of "78758" in the column 304. Some or all of the columns 302, 303, and 304 may be used as keys to access the records in the data 157 via a combination of specification of a key (e.g., the name field) and a value (e.g., "Marie") to identify the associated record (e.g., the record 300).

Figure 3B:
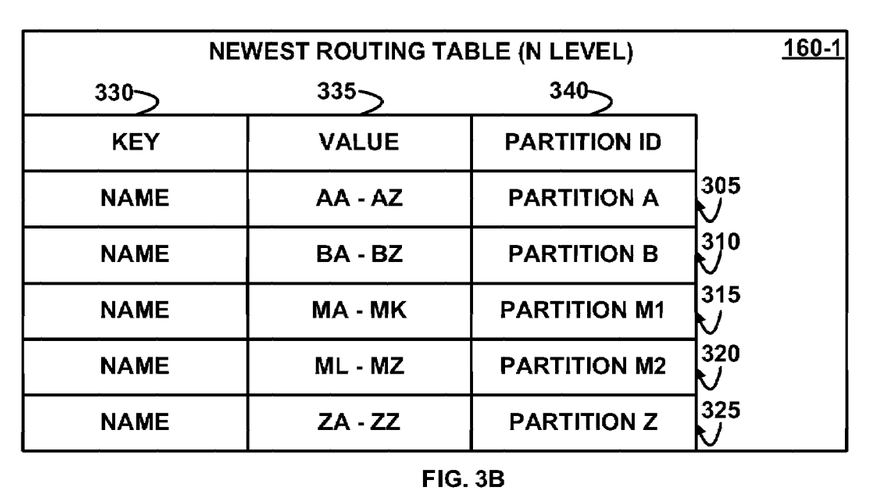
FIG. 3B depicts a block diagram of an example newest level routing table, according to an embodiment of the invention.

FIG. 3B depicts a block diagram of an example newest routing table (N level) 160-1, according to an embodiment of the invention. The routing table (N level) 160-1 is an example of the routing table 160 (FIG. 1). The router (N level) 158-1 and the router (N level) 158-2 use the routing table (N level) 160-1 to determine the partition 156 to which the data requested by a received request is allocated, in order to route the request to the proper partition.

The routing table (N level) 160-1 includes records 305, 310, 315, 320, and 325, each of which includes a key field 330, a value field 335, and a partition identifier field 340. The key field 330 identifies a column or field in the data 157. The value field 335 identifies a value or a range of values that may be present in the field or column in the data 157 identified by the respective key 330. The values 335 for the key 330 are allocated to or belong to their respective partition 156 identified by their respective partition identifier 340.

A value 335 being allocated to or belonging to a partition 156 identified by a partition identifier 340 does not necessarily mean that the value 335 for the key 330 is actually present or is actually stored in the data 157 of the partition 156 identified by the partition identifier 340. Instead, a value 335 for a key 330 being allocated to or belonging to a partition 156 identified by a partition identifier 340 means that if the value 335 for the key 330 is present or is stored in the data 157 in the partition 156 that is identified in the routing table (N level) 160-1, then that value 335 for that key 330 is stored in the partition 156 identified by its respective partition identifier 340. For example, if a value that starts "MB" is present in a partition that is identified in the routing table (N level) 160-1, then the value that starts "MB" is stored in the data (N level) 157-1 for partition "M1" 156-1 (record 315) and is not stored in data 157 in a partition identified in records 305, 310, 320, or 325.

The new partition scheme, as illustrated in the newest routing table (N level) 160-1 includes, among others, partitions M1 and M2 (records 315 and 320). The partition M1 identified in the record 315 contains records with values in the name field that start with Ma through Mk, and the partition M2 identified in the record 320 contains records with values in the name field that start with M1-Mz.

Notice that all of the partition identifiers 340 need not necessarily identify partitions that are at the N level. For example, the partition A 156-3 (identified in record 305), the partition B 156-4 (identified in record 305), and the partition Z 156-6 (record 325) are at the N-1 level, as illustrated in FIG. 2. But, the partition M1 156-1 (identified in record 315) and the partition M2 156-2 (identified in the record 320) are at the N level, as illustrated in FIG. 2. The router at a current partition level finds the proper partition to send a request to by finding the partition identifier in the current routing table at the current partition via the key and value associated with the request. The found partition identifier may identify a partition at the current partition level of the current router or at a different partition level from the current router.

Figure 3C:
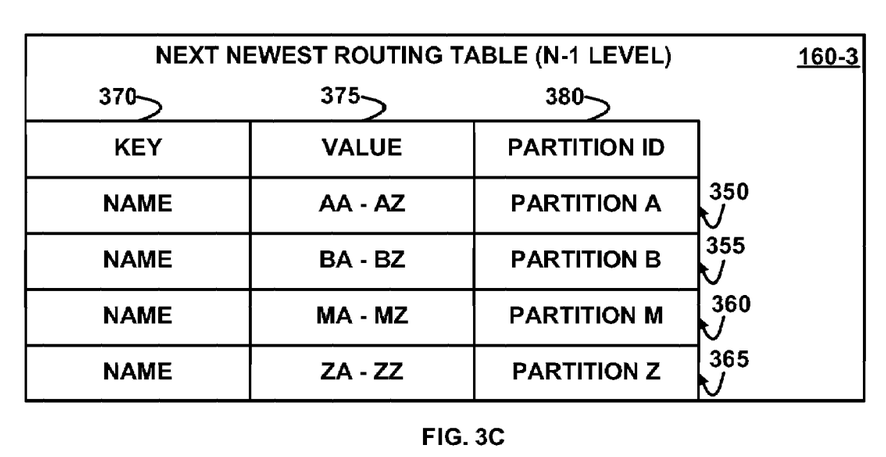
FIG. 3C depicts a block diagram of an example next newest level routing table, according to an embodiment of the invention.

FIG. 3C depicts a block diagram of an example N-1 level routing table 160-3, according to an embodiment of the invention. The routing table (N-1 level) 160-3 is an example of the routing table 160 (FIG. 1). The router (N-1 level) 158-3 uses the routing table (N-1 level) 160-3 to determine the partition to which the data requested by a received request is allocated, in order to route the request to the proper partition. The routing table 160-3 includes records 350, 355, 360, and 365, each of which includes a key field 370, a value field 375, and a partition identifier field 380.

The key field 370 identifies a column or field in the data 157. The value field 375 identifies a value or a range of values that may be present in the field or column in the data 157 identified by the respective key 370. The values 375 for the key 370 are allocated to or belong to their respective partition 156 identified by their respective partition identifier 380.

Figure 4:
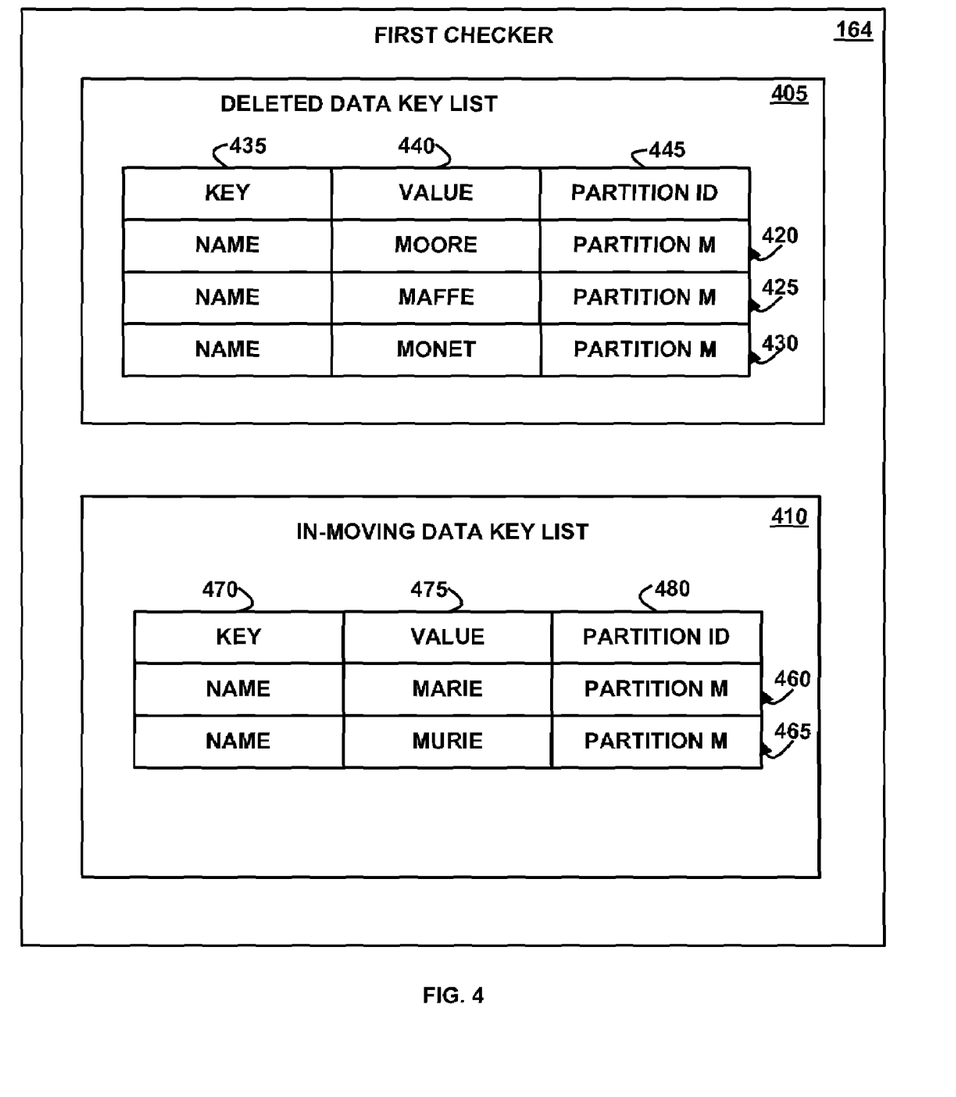
FIG. 4 depicts a block diagram of an example data structure for a first checker, according to an embodiment of the invention.

FIG. 4 depicts a block diagram of an example data structure for a first checker 164, according to an embodiment of the invention. The first checker 164 includes a deleted data key list 405 and an in-moving data key list 410.

The deleted data key list 405 represents records that have been deleted from the data 157 of the partition 156. The deleted data key list 405 includes example records 420, 425, and 430, each of which includes a key field 435, a value field 440, and a partition identifier field 445. The values field 440 for the keys 435 have been deleted from the data 157 in the partition 156 identified by the partition identifier 445.

The in-moving data key list 410 includes example records 460 and 465, each of which includes a key field 470, a value field 475, and a partition identifier field 480. Records in the data 157 that are represented by the key field 470 and the value field 475 are in the process of being moved from the partition 156 identified by the partition identifier field 480.

Figure 5:
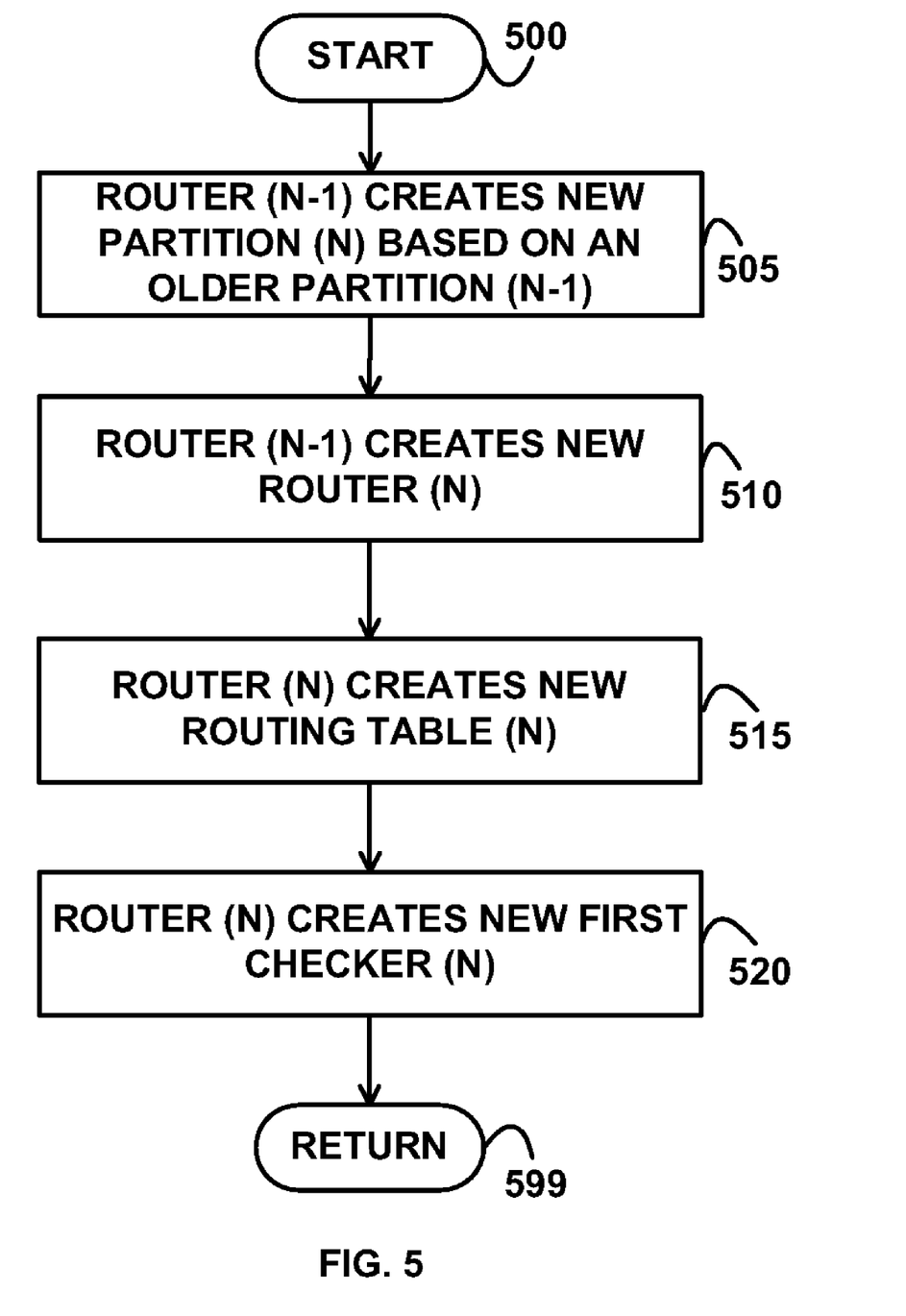
FIG. 5 depicts a flowchart of example processing for creating a new partition, according to an embodiment of the invention.

FIG. 5 depicts a flowchart of example processing for the router (N-1) 158-3 at a server computer system 100, according to an embodiment of the invention. Control begins at block 500. Control then continues to block 505 where the router (N-1 level) 158-3 at the partition (N-1 level) 156-5 creates new partitions (N level) 156-1 and 156-2 based on an older partition (N-1 level) 156-5. Control then continues to block 510 where the router (N-1) 158-3 creates the new routers (N level) 158-1 and 158-2.

Control then continues to block 515 where the router (N level) 158-1 creates the new routing table (N level) 160-1 and the router (N level) 158-2 creates the new routing table (N level) 160-2. The routing tables (N level) 160-1 and 160-2 may be identical routing tables, and the routers 158-1 and 158-2 may be identical routers. Control then continues to block 520 where the router (N level) 158-1 creates the new first checker (N level) 164-1 and the router (N level) 158-2 creates the new first checker (N level) 164-2. The data (N level) 157-1 and 157-2 are not necessarily created at the time of the creation of their respective partitions 156-1 and 156-2. Control then continues to block 599 where the logic of FIG. 5 returns.

Figure 6:
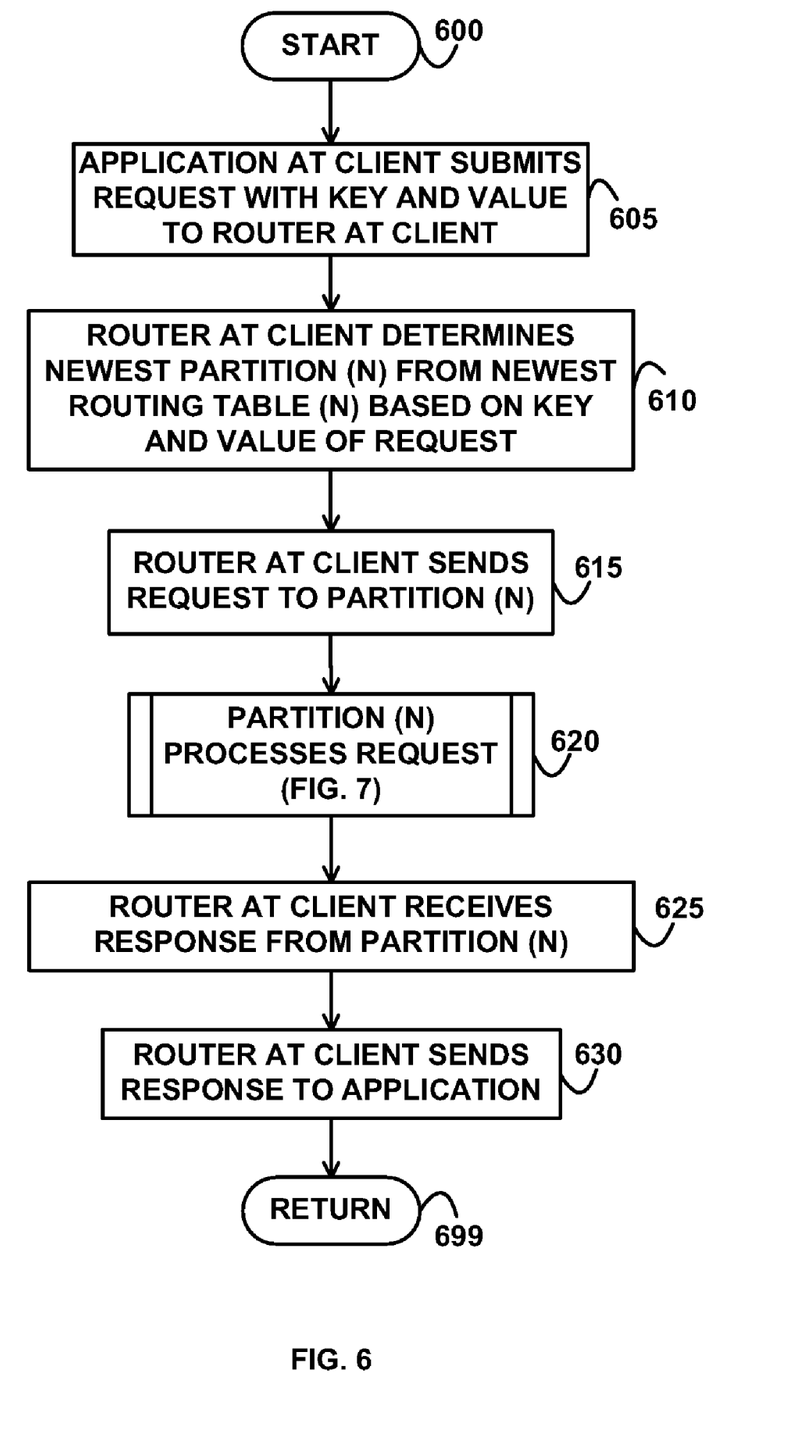
FIG. 6 depicts a flowchart of example processing for a router at a client, according to an embodiment of the invention.

FIG. 6 depicts a flowchart of example processing for a router 158 at a client computer system 132, according to an embodiment of the invention. Control begins at block 600. Control then continues to block 605 where the application 170 at the client computer system 132 submits a request to the router 158 at the client computer system 132. The request includes a key and a value for the key. The key identifies a field or column in the data 157. The value is a data value within that identified field, record, or column. Together, the key and the value of the key identify a record, row, or data item within the data 157, and that record, row, or data item may include the value and other data as well.

Control then continues to block 610 where the router 158 at the client computer system 132 determines the newest partition (N level) from the newest routing table (N level) based on the key and the value that were received with the request. For example, if the received key is "name" and the received value is "Marie," the router 158 at the client computer system 132 determines the newest partition M1 340 in the record 315 by finding the name key in the key field 330 and the value "Marie" within the range "MA-MK" of the value 335.

Control then continues to block 615 where the router 158 at the client computer system 132 sends the request to the determined partition (N level). Control then continues to block 620 where the partition (N level) processes the request, as further described below with reference to FIG. 7. Control then continues to block 625 where the router 158 at the client computer system 132 receives a response from the partition (N level). Control then continues to block 630 where the router 158 at the client computer system 132 sends the response to the application 170. Control then continues to block 699 where the logic of FIG. 6 returns.

Figure 7:
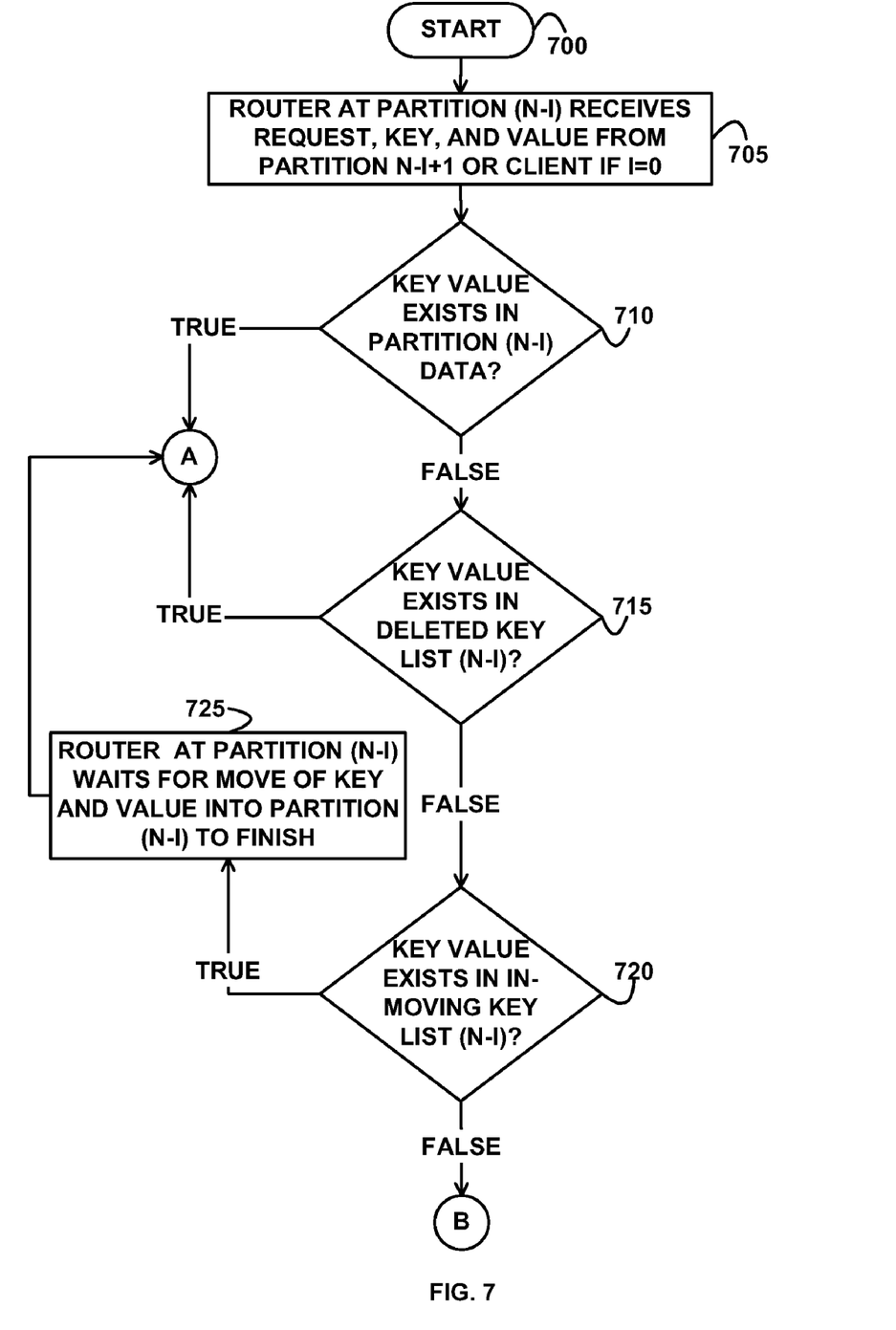
FIG. 7 depicts a flowchart of example processing for a router at a partition, according to an embodiment of the invention.
Figure 8:
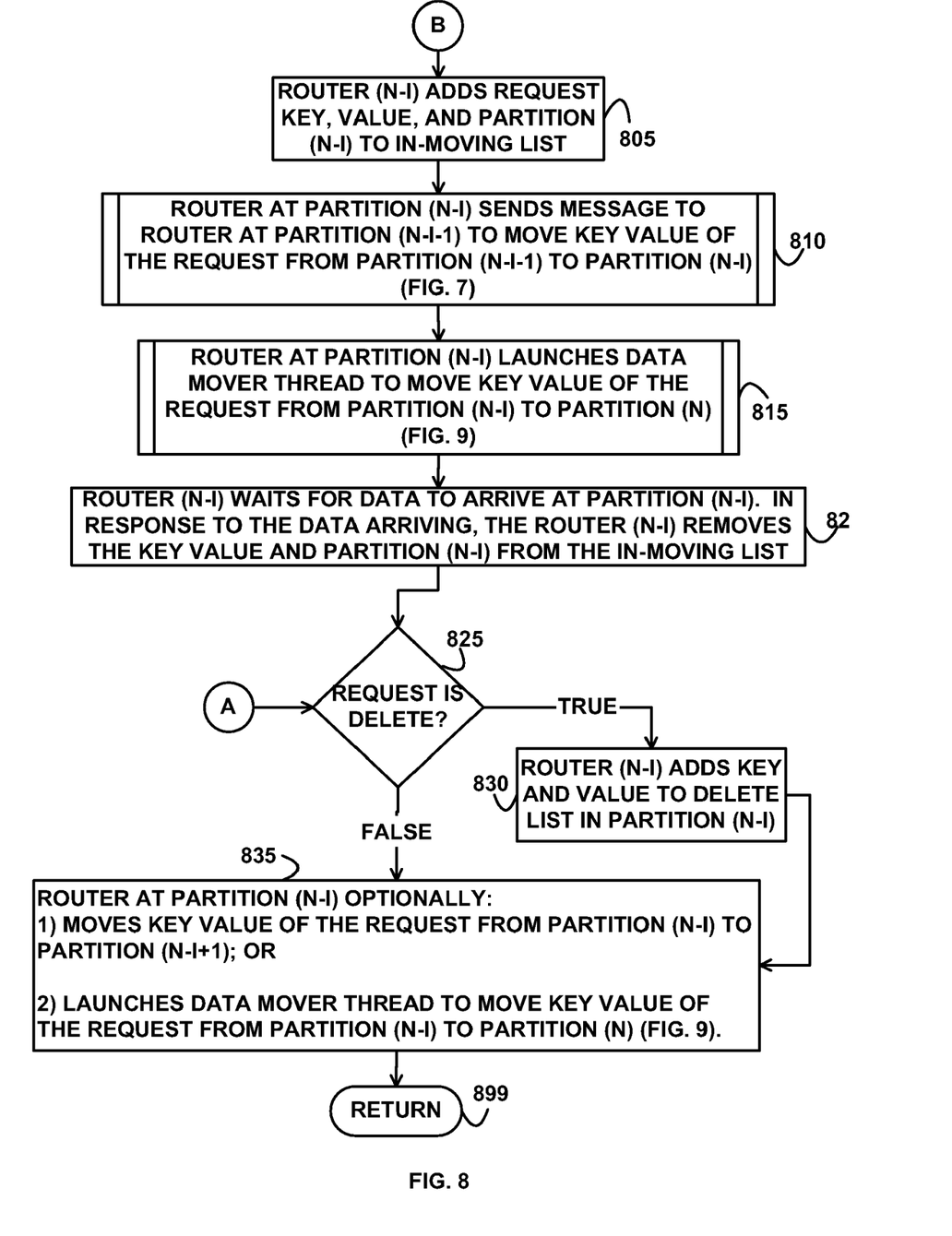
FIG. 8 depicts a flowchart of further example processing for a router at a partition, according to an embodiment of the invention.

FIGS. 7 and 8 depict flowcharts of example processing for a current router (N-1 level) 158 at a current partition (N-1 level) 156, according to an embodiment of the invention. As used herein, "N-1" refers to the current partition level, meaning the partition level associated with the router 158 that is currently executing the illustrated logic. The current partition level "N-1" is expressed in terms of the difference from the newest partition level "N." Thus, if I=0, the current partition level is the newest created partition level 205-1; if I=1, the current partition level is the next newest created partition level 205-2, etc. Further, the partition level "N-I-1" refers to the partition level that is one level older than the current partition level, and "N-I+1" refers to the partition level that is one level newer than the current partition level. As a special case, if I=0, N-I+1 refers to the client computer system 132 because no partition level exists that is newer than the newest partition level, and the client computer system 132 sends requests to, and receives responses from, partitions at the newest partition level.

Control begins at block 700. Control then continues to block 705 where the current router (N-I level) 158 at the current partition (N-I level) 156 receives a request, a key, and a value for the key from the newer partition (N-I+1 level), or the client computer system 132 if I=0. Control then continues to block 710 where the current router (N-I level) 158 at the current partition (N-I level) 156 determines whether the value exists in a field identified by the key in the current data (N-I level) 157 of the current partition (N-I level) 156.

If the determination at block 710 is true, then the value exists in a field identified by the key in the current data (N-I level) 157 in the current partition (N-I level) 156, so control continues to block 825 in FIG. 8 where the current router (N-I level) 158 at the current partition (N-I level) 156 determines whether the request is a delete request. If the determination at block 825 is true, then the request is a delete request, so control continues to block 830 where the current router (N-I level) 158 at the current partition (N-I level) 156 adds the key and value to the current deleted data key list (N-I level) 405 in the current first checker (N-I level) 164 current partition (N-I level) 156. Control then continues to block 835 where the current router (N-I level) 158 at the current partition (N-I level) 156 optionally either: 1) moves the record identified by the key and value of the request from the current data (N-I level) 157 at the current partition (N-I level) 156 to the next-newer data (N-I+1 level) 157 of the next-newer partition level (N-I+1 level); or 2) launches a data mover thread to move the record identified by the key and value of the request from the current data (N-I level) 157 in the current partition (N-I level) 156 to the newest data (N) of the newest partition (N) 156, as further described below with reference to FIG. 9. Moving the record includes deleting the record from the current data (N-I level) after sending the record to the newer partition (N-I+1 level) or after sending the record to the newest partition (N). If I=0, moving the record to the newer partition (N) 156 means sending the data in a response to the client 132. Control then continues to block 899 where the logic of FIG. 8 returns.

If the determination at block 825 is false, then the request is not a delete request, so control continues to block 835, as previously described above.

If the determination at block 710 is false, then the value does not exist in a field identified by the key in the current data (N-I level) 157 of the current partition (N-I level) 156, so control continues to block 715 where the current router (N-I level) 158 at the current partition (N-I level) 156 determines whether the key and value exist in the current deleted data key list (N-1 level) 405 of the current first checker (N-1 level) 164 of the current partition (N-I level) 156. If the determination at block 715 is true, then the key and value exist in the current deleted data key list (N-I level) 405 and the key value has been deleted from the current data (N-I level) 157 of the current partition (N-I level) 156, so continues to block 825 in FIG. 8, as previously described above.

If the determination at block 715 is false, then the key and value do not exist in the deleted key list (N-I level) 405 and the key value has not been deleted from the current data (N-I level) 157 of the current partition (N-I level) 156, so continues to block 720 where the current router (N-I level) 158 at the current partition (N-I level) 156 determines whether the key and value exist in the current in-moving key list (N-I level) 410 in the current partition (N-1 level) 156. If the determination at block 720 is true, then the key and value exists in the current in-moving key list (N-I level) 410 at the current partition (N-I level) 156 and the record identified by the key value is in the process of being moved into the data (N-I level) 157 of the current partition (N-I level) 156, so control continues to block 725 where the current router (N-I level) 158 at the current partition (N-I level) 156 waits for the move of the record identified by the key and value into the current data (N-1 level) 157 of the current partition (N-1 level) 156 to finish. Once the move has finished, control then continues to block 825, as previously described above.

If the determination at block 720 is false, then the key and value do not exist in the current in-moving key list (N-1 level) 410 at the current partition (N-1 level) 156 and the record identified by the key value is not in the process of being moved into the current data (N-I level) 157 of the current partition (N-I level) 156, so control continues to block 805 in FIG. 8 where the current router (N-I level) 158 at the current partition (N-I level) 156 adds the requested key, value, and identifier of the current partition (N-I level) 156 to the current in-moving list (N-I level) 410 at the current partition (N-I level) 156. Control then continues to block 810 where the current router (N-1 level) 158 at the current partition (N-I level) 156 sends a message with the request to the next-older router (N-I-1 level) at the next-older partition level (N-I-1 level). The message instructs the next older router (N-I-1 level) at the next older partition level (N-I-1 level) to move the record identified by the key and value of the request from the next older data (N-I-1 level) 157 in the next older partition (N-I-1 level) 156 to the current data (N-I level) 157 in the current partition (N-I level) 156, illustrated via a recursive call to the logic of FIG. 7. A recursive call is used for convenience of illustration only, and in another embodiment the routers 158 used by the various partition levels 205-1 and 205-2 may be separate entities that do not call each other recursively.

Control then continues to block 815 where the current router (N-I level) 158 at the current partition (N-I level) 156 launches a data mover thread to move the record identified by the key and value of the request from the current partition (N-I level) 156 to the newest partition (N) 156 in the newest partition level, as further described below with reference to FIG. 9. Control then continues to block 820 where the current router (N-I level) 158 waits for the record identified by the key value to arrive at the current data (N-I level) 157 at the current partition (N-I level) 156. In response to the record arriving, the current router (N-I level) 158 removes (deletes) the key, value, and the current partition (N-I level) 156 from the in-moving list 410. Control then continues to block 825, as previously described above.

Figure 9:
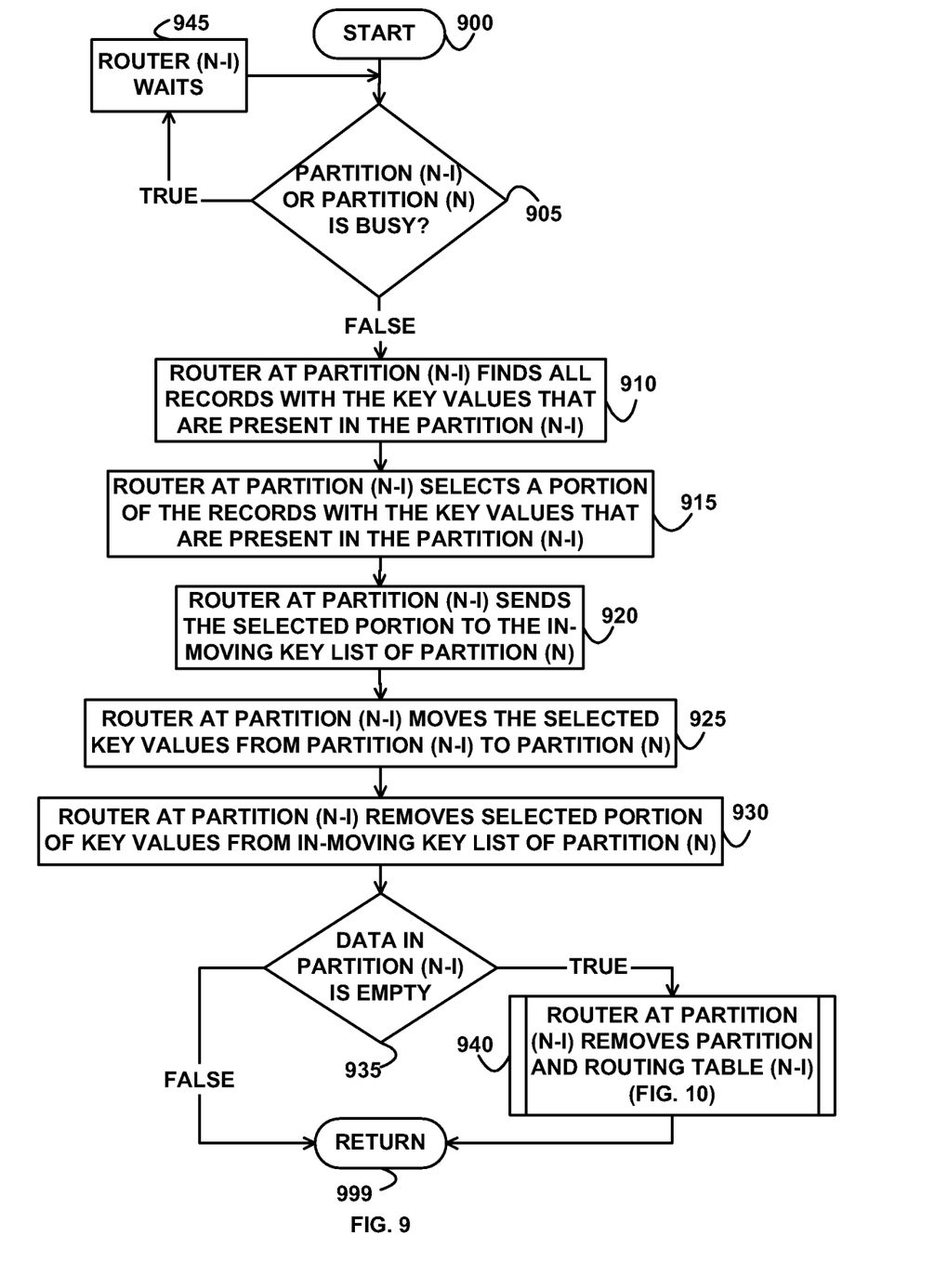
FIG. 9 depicts a flowchart of example processing for moving values between partitions, according to an embodiment of the invention.

FIG. 9 depicts a flowchart of example processing for moving values between partitions, according to an embodiment of the invention. Control begins at block 900. Control then continues to block 905 where the router (N-I level) 156 determines whether the current partition (N-I level) 156 or the newest partition (N) 156 is busy. If the determination at block 905 is true, then at least one of the current partition (N-I level) 156 or the newest partition (N) 156 is busy, meaning the current router (N-I level) 158 or the router (N) is busy processing requests or moving data, so control continues to block 945 where the router waits for a period of time. Control then returns to block 905, as previously described above.

If the determination at block 905 is false, then both of the current partition (N-I level) 156 and the newest partition (N) 156 are not busy, so control continues to block 910 where the current router (N-I level) 158 at the current partition (N-I level) 156 finds all records, rows, or records in the current partition (N-I level) 156 that have a key and a value that matches the key and value of the request. Control then continues to block 915 where the current router (N-I level) 158 at the current partition (N-I level) 156 selects a portion of the records with the key values that are present in the current partition (N-I level) 156. Control then continues to block 920 where the current router (N-1 level) 158 at the current partition (N-I level) 156 sends the selected portion of the records associated with the key values to the in-moving key list 410 of the newest partition (N) 156. Control then continues to block 925 where the current router (N-I level) 158 moves the selected records associated with the key values from the current data (N-I level) 157 in the current partition (N-I level) 156 to the newest partition (N) 156 and deletes the selected records from the current data (N-I level) 157 in the current partition (N-I level) 156. Control then continues to block 930 where the current router (N-I level) 158 at the current partition (N-I level) 156 removes (deletes) the selected portion of the key values from the in-moving key list 410 of the newest partition (N) 156.

Control then continues to block 935 where the current router (N-I level) 158 at the current partition (N-I level) 156 determines whether the current data (N-I level) 157 in the current partition (N-I level) 156 is empty. If the determination at block 935 is true, then the current data (N-I level) 157 in the current partition (N-I level) 156 is empty, so control continues to block 940 where the current router (N-I level) 158 at the current partition (N-I level) 156 removes (deletes) the current partition (N-I level) 156 and the current routing table (N-I level) 160, as further described below with reference to FIG. 10. Control then continues to block 999 where the logic of FIG. 9 returns.

If the determination at block 935 is false, then the current data (N-I level) 157 in the current partition (N-I level) 156 is not empty, so control continues to block 899 where the logic of FIG. 9 returns.

Both on-demand client-initiated data-moving between partitions and server-initialized data-moving between partitions are supported by embodiments of the invention. In this way, records may be moved from older to newer partitions while requests to the partitions are still fulfilled. Client-initiated data-moving between partitions takes higher priority to ensure client service and to ensure that performance is not interrupted during re-partitioning of data. Server-initiated data-moving speeds up the re-partitioning processing by using free cycles of computers, e.g., by waiting until both partitions are not busy, as previously described above with respect to block 905.

Figure 10:
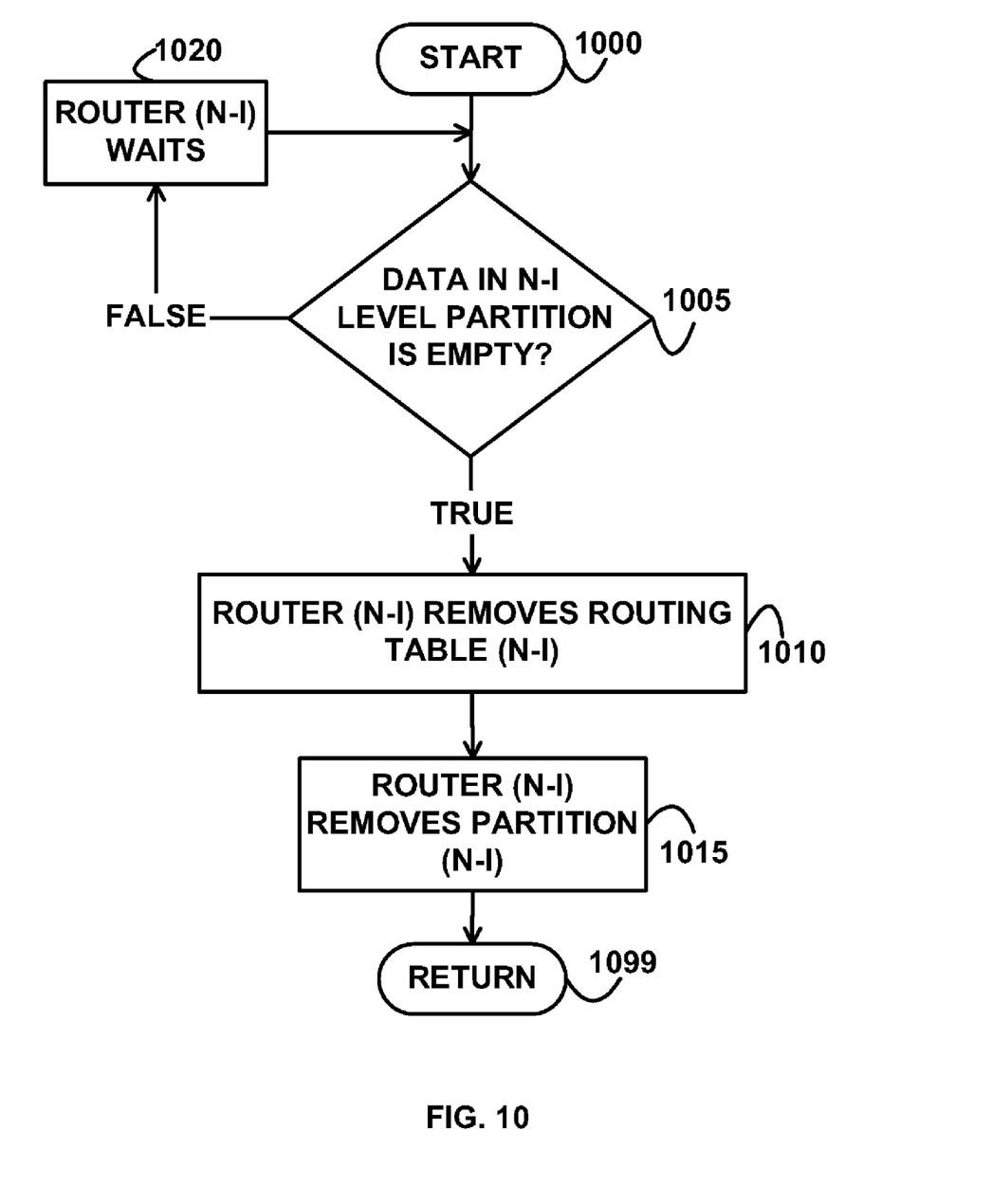
FIG. 10 depicts a flowchart of example processing for removing a partition, according to an embodiment of the invention.

FIG. 10 depicts a flowchart of example processing for removing a current partition (N-I level) 156, according to an embodiment of the invention. Control begins at block 1000. Control then continues to block 1005 where the current router (N-I level) 158 determines whether the current data (N-I level) 157 in the current partition (N-I level) 156 is empty. If the determination at block 1005 is true, then the current data (N-I level) 157 in the current partition (N-I level) 156 is empty (contains no records), so control continues to block 1010 where the current router (N-I level) 158 removes (deletes) the routing table (N-I level) from the current partition (N-I level) 156. Control then continues to block 1015 where the current router (N-I level) 158 removes (deletes) the current partition (N-I level) 156 from the memory 102. Control then continues to block 1099 where the logic of FIG. 10 returns.

If the determination at block 1005 is false, then the current data (N-I level) 157 in the current partition (N-1 level) 156 is not empty (still contains at least one record), so control continues to block 1020 where the current router (N-I level) 158 waits for a period of time. Control then returns to block 1005, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:

receiving a request at a current router in a current partition, wherein the current partition is one of a plurality of partitions, wherein data is partitioned into the plurality of partitions, wherein the plurality of partitions are divided into a plurality of levels, wherein a current level comprises the current partition and at least one other of the plurality of partitions, wherein the levels are ordered by creation times of the levels, from a newest level to an oldest level, and wherein the request comprises a key and a value for the key, wherein the key identifies a field in a record in the data, and wherein each of the plurality of partitions comprises a respective router;

determining whether the value exists in the field in the current partition, wherein the current router in the current partition performs the determining whether the value exists in the field in the current partition;

if the value does exist in the field in the current partition, moving the record with the value in the field from the current partition to a next-newer partition if a next-newer router in the next-newer partition sent the request, and deleting the record from the current partition, wherein the current router in the current partition performs the moving the record and the deleting the record, and wherein a next-newer level of the next-newer partition has a next-newer creation time that is next-newer than a current creation time of the current level of the current partition; and if the value does not exist in the field in the current partition sending a message from the current partition to a next-older router in a next-older partition in a next-older level, wherein the next-older level has a next-older creation time that is next-older than the current creation time of the current level of the current partition, wherein the message instructs the next-older router in the next-older partition to move the record with the value in the field from the next-older partition to the current partition.

2. The method of claim 1, further comprising:

if the value does exist in the field in the current partition, sending the record with the value in the field from the current partition to a client router in a client computer if the client router sent the request, wherein the current router performs the sending the record with the value in the field from the current partition to the client router in the client computer.

3. The method of claim 2, further comprising:

moving the record with the value in the field from the current partition to a newest partition at a newest level, wherein the newest level was created at a newest creation time that is newer than the creation times of all other of the plurality of levels, wherein the moving the record with the value in the field from the current partition to the newest partition further comprises finding a plurality of records in the current partition, wherein the key further identifies a field in the plurality of records, selecting a portion of the plurality of records, and moving the portion of the plurality of records from the current partition to the newest partition, wherein the current router in the current partition performs the moving the record with the value in the field from the current partition to the newest partition, wherein the client router sends the request to a newest router in the newest partition.

4. The method of claim 3, wherein the moving the record with the value in the field from the current partition to the newest partition further comprises:
waiting to perform the moving the record with the value in the field from the current partition to the newest partition until the current partition and the newest partition are not busy moving other records.

5. The method of claim 3, further comprising:
deleting the current partition if the data in the current partition is empty.

6. The method of claim 1, wherein the determining further comprises:
determining whether the value for the key has been deleted from the current partition.

7. The method of claim 1, wherein the determining further comprises:
determining whether the record is already being moved from the next-older partition to the current partition.

8. A method for configuring a computer, wherein the method comprises:
configuring the computer to receive a request at a current router in a current partition, wherein the current partition is one of a plurality of partitions, wherein data is partitioned into the plurality of partitions, wherein the plurality of partitions are divided into a plurality of levels, wherein a current level comprises the current partition and at least one other of the plurality of partitions, wherein the levels are ordered by creation times of the levels, from a newest level to an oldest level, and wherein the request comprises a key and a value for the key, wherein the key identifies a field in a record in the data;
configuring the computer to determine whether the value exists in the field in the current partition, wherein the current router in the current partition determines whether the value exists in the field in the current partition;
configuring the computer to, if the value does exist in the field in the current partition, move the record with the value in the field from the current partition to a next-newer partition if a next-newer router in the next-newer partition sent the request, and delete the record from the current partition, wherein the current router in the current partition performs the move of the record and the delete of the record, and wherein a next-newer level of the next-newer partition has a next-newer creation time that is next-newer than a current creation time of the current level of the current partition; and
configuring the computer to, if the value does not exist in the field in the current partition, send a message from the current partition to a next-older router in a next-older partition in a next-older level, wherein the next-older level has a next-older creation time that is next-older than the current creation time of the current level of the current partition, wherein the message instructs the next-older router in the next-older partition to move the record with the value in the field from the next-older partition to the current partition.

9. The method claim 8, wherein the configuring the computer to determine further comprises:
configuring the computer to determine whether the value for the key has been deleted from the current partition.

10. The method of claim 8, wherein the configuring the computer to determine further comprises:
configuring the computer to determine whether the record is already being moved from the next-older partition to the current partition.

11. The method of claim 8, further comprising:
configuring the computer to, if the value does exist in the field in the current partition, send the record with the value in the field from the current partition to a client router in a client computer if the client router set the request, wherein the current router performs the send of the record with the value in the field from the current partition to the client router in the client computer.

12. The method of claim 11, wherein the configuring the computer to move the record with the value in the field from the current partition to the newest partition further comprises:
configuring the computer to wait to perform the move of the record from the current partition to the newest partition until the current partition and the newest partition are not busy moving other records.

13. The method of claim 11 further comprising:
configuring the computer to move the record with the value in the field from the current partition to a newest partition at a newest level, wherein the newest level was created at a newest creation time that is newer than the creation times of all other of the plurality of levels, wherein the configuring the computer to move the record with the value in the field from the current partition to the newest partition further comprises configuring the computer to find a plurality of records in the current partition, wherein the key further identifies a field in the plurality of records, configuring the computer to select a portion of the plurality of records, and configuring the computer to move the portion of the plurality of records from the current partition to the newest partition, wherein the current router in the current partition performs the move of the record with the value in the field from the current partition to the newest partition, wherein the client router sends the request to a newest router in the newest partition.

14. The method of claim 8, further comprising:
configuring the computer to delete the current partition if the data in the current partition is empty.

* * * * *